No. 730,670.

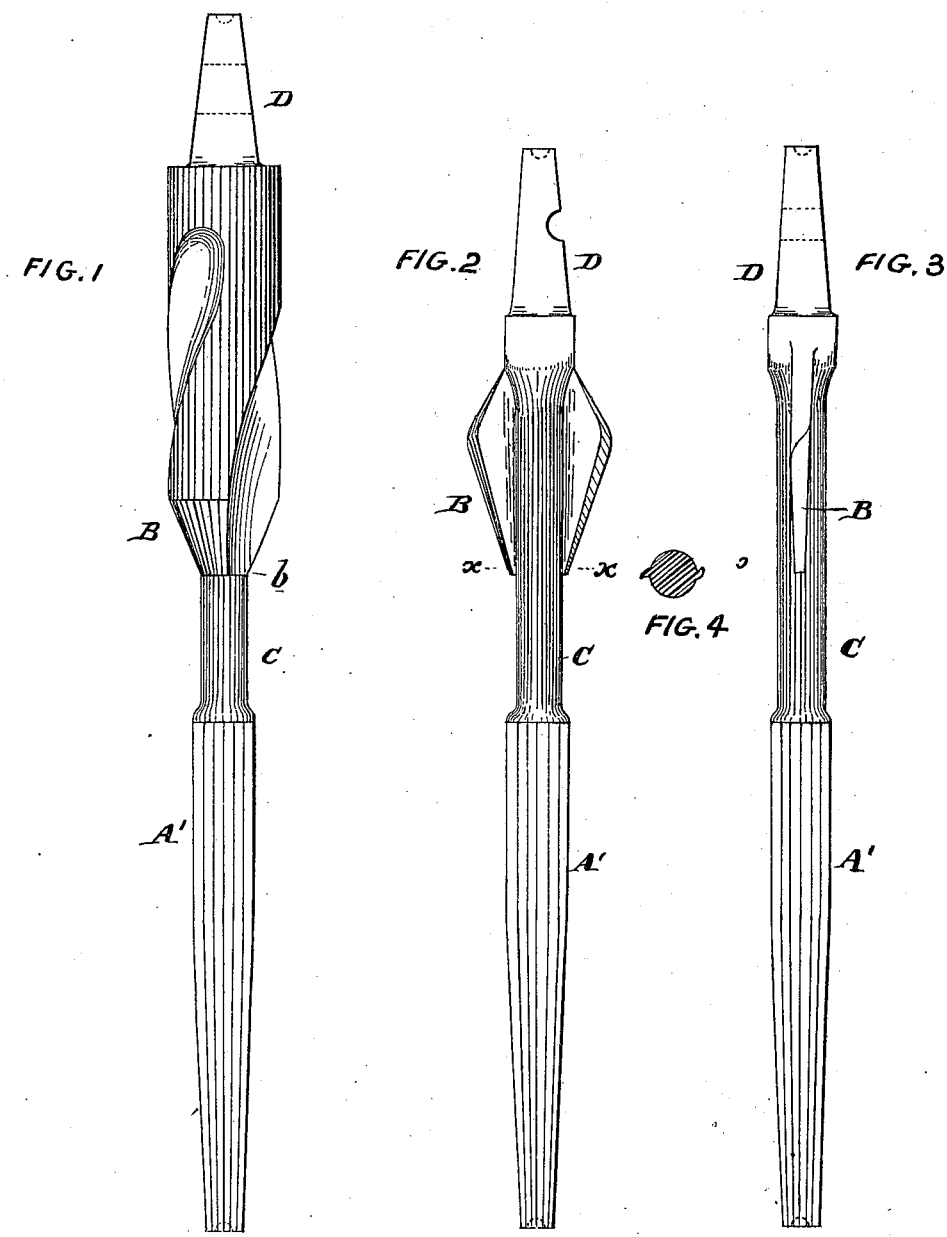

Patented June 9, 1903.

UNITED STATES PATENT OFFICE.

ALLEN E. J. LUCKHURST, OF PHILADELPHIA, PENNSYLVANIA.

COMBINED CUTTING AND COUNTERSINKING TOOL.

SPECIFICATION forming part of Letters Patent No. 730,670, dated June 9, 1903.

Application filed September 25, 1902. Serial No. 124,747. (No model.)

*To all whom it may concern:*

Be it known that I, ALLEN E. J. LUCKHURST, of the city and county of Philadelphia, State of Pennsylvania, have invented an Improvement in a Combined Cutting and Countersinking Tool, of which the following is a specification.

My invention has reference to combined reaming and countersinking tools; and it consists of certain improvements which are fully set forth in the following specification and shown in the accompanying drawings, which form a part thereof.

Heretofore it has been customary to drill holes in sheet-metal plates and subsequently ream and countersink said holes, requiring two operations. Often the holes are bored and reamed out of line or diagonal to the surface of the plate, and the subsequent countersinking is not properly performed, as there is no means of guiding the countersinking-tool in the hole when using pneumatic tools, such as largely employed in modern shipbuilding.

The object of combining reaming and countersinking tools is to do away with the necessity of changing tools, which with the methods at present in use has to be done when reaming holes in steel, iron, or other metals, especially plates, which are subsequently countersunk or recountersunk, and I thereby secure a great saving both in time and labor as the result of the use of the combination.

My invention consists of the reaming part of the tool combined with an upper or countersinking part and a connecting-neck, preferably of considerable length, the neck being very slightly smaller than the largest diameter of the reaming-tool and the smaller end of the countersinking-tool adjacent to the neck, so as to act as a guide for the countersinking-tool.

My invention will be better understood by reference to the drawings, in which—

Figure 1 is a view of a combined reaming and countersinking tool embodying one type of my invention. Figs. 2 and 3 are elevations of modified forms of reaming and countersinking tools embodying my invention, and Fig. 4 is a cross-section of Fig. 2 on line *x x*.

In Fig. 1, A' is a reaming portion; B, the countersinking part; C, the neck connecting the parts A' and B, and D the shank for connecting with the rotary pneumatic or other engine or brace. The reamer A' may be of any suitable construction; but its largest cutting diameter is greater than the diameter of the neck C. The countersinking part B may be of any construction and have any angle desired. The lower end *b* of the countersinking part B is of slightly smaller diameter than the cutting diameter of the reamer A', so that it will readily pass into the hole reamed by the part A', and to enable this to take place the neck C, joining the reamer A' and countersinking part B, is of slightly-smaller diameter than the hole reamed by the reamer A'. The function of the neck is to provide a guide for the countersinking-tool and a clearance-space to enable the borings of the countersinking part B to freely escape. In other words, the neck facilitates the entrance and working of the countersinking-tool after the reamer has passed through the hole and guides it, and so long as it performs these functions it may be modified without detracting from the efficiency of the combination.

In Figs. 2 to 4 the countersinking-tool B is made with wings or fins radiating from the neck or shank and having cutting edges.

While I prefer the constructions herein set out, the minor details may be modified without departing from the spirit of the invention.

Having now described my invention, what I claim as new, and desire to secure by Letters Patent, is—

1. As a new article of manufacture, a hole-reaming tool and countersinking-tool arranged in alinement and connected by an intervening neck of very slightly smaller diameter than the greatest reaming diameter of the hole-reaming tool so as to act as a guide for the countersinking-tool and in which the smaller or entering part of the countersinking-tool is of smaller diameter than the greatest diameter of the reaming-tool and in which further, the hole-reaming tool, the neck and the countersinking-tool are formed of one continuous or integral piece of steel.

2. As a new article of manufacture, a hole-reaming tool and countersinking-tool arranged in alinement and connected by an intervening neck of slightly-smaller diameter than the reaming diameter of the hole-reaming tool so as to act as a guide for the countersinking-tool and in which the smaller or entering part of the countersinking-tool is of smaller diameter than the reaming diameter of the reaming-tool and its outer part terminates in a boring extension E.

3. As an article of manufacture, a tool consisting of a slightly-tapered hole-cutting part having longitudinal grooves and a countersinking part arranged in alinement therewith and in which the smaller end of the countersinking part is of less diameter than the greatest cutting diameter of the tapered hole-cutting part, the said hole-cutting and countersinking portions being connected by an intervening neck portion of very slightly smaller diameter than the greatest cutting diameter of the hole-cutting part, and the several portions being formed of one integral piece of steel.

In testimony of which invention I have hereunto set my hand.

ALLEN E. J. LUCKHURST.

Witnesses:
R. M. HUNTER,
R. M. KELLY.